July 27, 1926.

F. B. STANLEY 1,594,277

HEDGE TRIMMER

Filed Oct. 4, 1924

Inventor
F. B. Stanley,
By Clarence A. O'Brien.
Attorney

Patented July 27, 1926.

1,594,277

UNITED STATES PATENT OFFICE.

FREDERICK B. STANLEY, OF PETERSBURG, VIRGINIA.

HEDGE TRIMMER.

Application filed October 4, 1924. Serial No. 741,609.

This invention relates to improvements in hedge trimmers and is more particularly adapted to a hedge trimmer which may be easily and efficiently operated.

One of the important objects of the present invention is to provide a hedge trimmer wherein means is associated with the cutter supporting shaft for facilitating the reciprocatory movement thereof.

A further object of the invention is to provide a hedge trimmer of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification, and in which like numerals designate like parts throughout the same:

Figure 1:
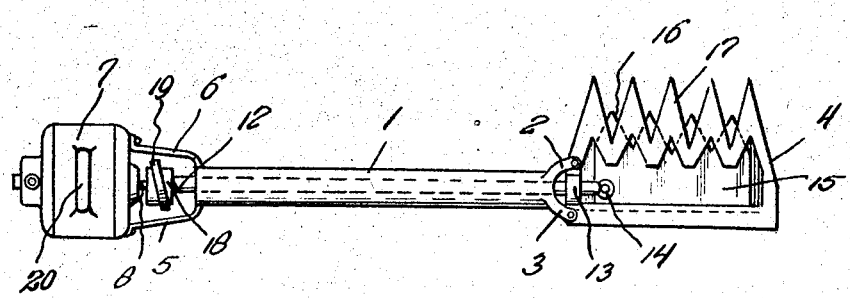
Figure 1 is a top plan view of the hedge trimmer embodying my invention.

In the drawing wherein for the purpose of illustration is shown the preferred embodiment of my invention, the numeral 1 designates an elongated tubular housing. The forward end thereof terminates in a pair of ears 2 and 3 which provide a means for supporting the cutter guard designated generally by the numeral 4. As the latter may be of any well known construction such as is well known in the art, a further detailed description thereof is not thought necessary.

Figure 2:
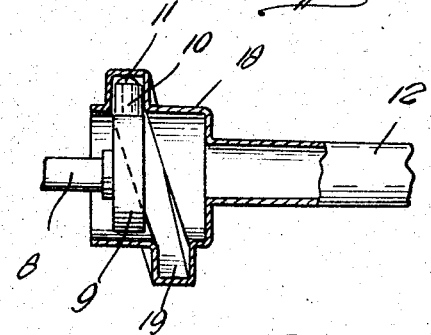
Figure 2 is an enlarged detail view of the reciprocating means.

The rear end of the tubular housing 1 has extending therefrom at diametrically opposite points the brackets 5 and 6 which support a small electric motor 7 of any well known construction. The drive shaft thereof is illustrated at 8 and supported on the outer end thereof is the disc 9. A roller 10 is supported on the periphery of the disc 9 by means of the pin 11 as is clearly illustrated in Figure 2, and the purpose thereof will hereinafter be more fully described.

Extending longitudinally through the tubular housing 1 is the elongated tubular shaft 12. The forward end of the shaft 12 is disposed through a suitable guide 13 formed on the guard 4 and the extreme forward end of the tubular shaft is flattened as at 14 and has secured thereto the cutter bar 15. The cutter teeth of the bar 14 are illustrated at 16. The cutter teeth 16 are associated with the fingers 17 of the guard 4 in the usual manner.

The rear end of the tubular shaft 12 extends beyond the rear end of the tubular housing 1 and has formed thereon the tubular enlargement or casing 18. Formed in the enlarged portion 18 is the annular channel or groove 19, the same being disposed at an angle with respect to the longitudinal axis, the purpose of this construction being presently apparent. A handle 20 is provided on the motor 7 whereby the hedge trimmer may be conveniently handled when in use.

In use, the hedge trimmer above described is supported in operative position by holding the housing in one hand and the handle 20 of the motor in the other. When the motor is started, the disc and the roller carried thereby on the outer end of the drive shaft 8 will rotate and the roller 10 will travel in the angularly disposed channel 19 causing the tubular shaft 12 to reciprocate within the housing 1 and further facilitating the reciprocation of the cutter bar 15. The roller 10 cannot become disengaged from the annular channel or groove 19 thereby assuring the reciprocation of the shaft and the cutter bar at all times while the motor is in operation. A hedge trimmer of the above mentioned character, may be easily and efficiently operated and will save considerable time and labor in trimming hedges.

Figure 3:
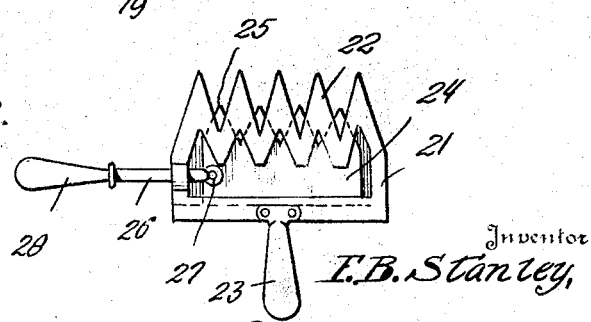
Figure 3 is a top plan view of a modification.

In Figure 3 of the drawing a modification is shown wherein a guard comprises a frame 21, the guards or fingers 22 extending from the forward edge of the frame. A handle 23 extends from the rear portion of the frame. The cutter bar 24 is slidably supported within the frame 21 and the cutter teeth 25 cooperate with the guards or fingers 22 in the usual manner. A tubular shaft 26 is flattened at its forward end as at 27 and is secured to the cutter bar 24. The shaft 26 extends through the side of the frame 21 and a handle 28 is associated with the outer end of the shaft to facilitate the reciprocatory movement of the cutter bar within the frame.

It will thus be seen from the foregoing description, that a hedge trimmer has been provided which is simple in construction, and the parts are further so arranged as to permit the disassembling of the device for the purpose of resharpening the cutting edges of the cutter bar.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination, an elongated tubular housing, an electric motor supported on the rear end of the housing and having its shaft axially alined with the tubular housing, a tubular shaft extending longitudinally through the housing and having its axis in alinement with the axis of the motor shaft, a cylindrical enlargement on the rear end of the shaft axially alined with the motor shaft, said enlargement provided with a sinuous annular groove interiorly thereof, a disk on the motor shaft within the cylindrical enlargement, and a roller extending radially from the periphery of the disk and positioned in the sinuous annular groove so that upon rotation of the shaft of the motor, the hollow shaft will be reciprocated through the tubular housing.

In testimony whereof I affix my signature.

FREDERICK B. STANLEY.